(12) United States Patent
Lee et al.

(10) Patent No.: US 12,093,832 B2
(45) Date of Patent: Sep. 17, 2024

(54) METHOD FOR DISTRIBUTING WORK POINTS TO A PLURALITY OF TASK-PERFORMING ROBOTS

(71) Applicant: MakinaRocks Co., Ltd., Seoul (KR)

(72) Inventors: Jeyeol Lee, Seoul (KR); Goncalves Rocha Yuri, Seoul (KR); Yu Jeong Jeong, Seoul (KR)

(73) Assignee: MakinaRocks Co., Ltd., Seoul (KR)

( * ) Notice: Subject to any disclaimer, the term of this patent is extended or adjusted under 35 U.S.C. 154(b) by 0 days.

(21) Appl. No.: 18/424,764

(22) Filed: Jan. 27, 2024

(65) Prior Publication Data

US 2024/0256877 A1    Aug. 1, 2024

(30) Foreign Application Priority Data

Jan. 30, 2023   (KR) .................. 10-2023-0011507
Jun. 22, 2023   (KR) .................. 10-2023-0080437

(51) Int. Cl.
    *G06N 3/08*      (2023.01)
    *G06N 3/086*     (2023.01)

(52) U.S. Cl.
    CPC .................................. *G06N 3/086* (2013.01)

(58) Field of Classification Search
    CPC ...................................................... G06N 3/086
    See application file for complete search history.

(56) References Cited

U.S. PATENT DOCUMENTS

2021/0349444 A1*   11/2021   Hemmer ............... B25J 9/1664

FOREIGN PATENT DOCUMENTS

| CN | 109872010 B | 6/2019 |
|---|---|---|
| JP | 08-036409 A | 2/1996 |
| KR | 10-1105325 B1 | 1/2012 |
| KR | 10-1179075 B1 | 9/2012 |
| KR | 10-2137033 A | 7/2020 |
| KR | 10-2020-0126537 A | 11/2020 |

(Continued)

OTHER PUBLICATIONS

Grenko et al ("On the Use of a Genetic Algorithm for Determining Ho-Cook Coefficients in Continuous Path Planning of Industrial Robotic Manipulators" Jan. 25, 2023) (Year: 2023).*

(Continued)

*Primary Examiner* — Lut Wong
(74) *Attorney, Agent, or Firm* — Dennemeyer & Associates LLC

(57) ABSTRACT

Disclosed is a method for distributing work points to a plurality of task-performing robots, the method performed by one or more processors of a computing device. The method may include: determining available work points for each of the plurality of task-performing robots; distributing target work points for each of the plurality of task-performing robots based on the determined available work points, and predicting a plurality of target work trajectories for each of the plurality of task-performing robots based on the distributed target work points; calculating a first loss or a second loss based on the predicted plurality of target work trajectories; and re-distributing target work points to each of the plurality of task-performing robots based on at least one of the calculated first loss or the calculated second loss.

9 Claims, 6 Drawing Sheets

(56) References Cited

FOREIGN PATENT DOCUMENTS

KR         10-2393859 B1     5/2022
KR         10-2468637 B1    11/2022

OTHER PUBLICATIONS

Gyasia et al ("Survey on artificial intelligence (AI) applied in welding: A future scenario of the influence of AI on technological, economic, educational and social changes" 2019) (Year: 2019).*
Zaitceva et al ("Methods of Intelligent Control in Mechatronics and Robotic Engineering: A Survey" 2022) (Year: 2022).*
Carlsona et al ("Minimizing Dimensional Variation and Robot Traveling Time in Welding Stations" 2014) (Year: 2014).*

* cited by examiner

METHOD FOR DISTRIBUTING WORK POINTS TO A PLURALITY OF TASK-PERFORMING ROBOTS

CROSS-REFERENCE TO RELATED APPLICATIONS

This application claims priority to and the benefit of Korean Patent Application No. 10-2023-0011507 filed in the Korean Intellectual Property Office on Jan. 30, 2023, the entire contents of which are incorporated herein by reference.

TECHNICAL FIELD

The present disclosure relates to a method for distributing work points to a plurality ofity of task-performing robots, and more particularly, to a method for distributing work points to a plurality ofity of task-performing robots to appropriately distribute work points to prevent excessive distribution from being concentrated on a specific robot, and reduce a collision risk.

BACKGROUND ART

A genetic algorithm, which can optimize distribution based on cost to distribute welding points to robots which are to perform work, can be used. In this case, in respect to the good distribution of the welding point to the robot to perform the work, each robot should be able to visit all distributed welding points by moving the distance with a small distance, and must appropriately distribute the welding points to prevent excessive distribution from being concentrated on a specific robot, and in order to reduce the collision risk, robots belonging to the same station should be able to minimize the overlap of a work area. Accordingly, in order to set a criterion of an efficient distribution using the genetic algorithm, the genetic algorithm should be changed to a problem form which can be made in an appropriate cost form and solved.

Further, multiple robots can be disposed in one station, work areas can be overlapped between robots according to how the welding point is distributed to each robot, and the overlapped work area then delays an operation of another robot in order to prevent a collision between the robots. In this case, even though each robot visits a given welding point within a small time, there is a risk of exceeding a time assigned per station due to occurrence of a series of waiting. Therefore, there is a need for a method for appropriately distributing work points to prevent the excessive distribution from being concentrated on a specific robot, and distributing the work points to a plurality of task-performing robots to reduce the collision risk.

On the other hand, the present disclosure has been derived at least based on the technical background described above, but the technical problem or object of the present disclosure is not limited to solving the problems or disadvantages described above. That is, the present disclosure may cover various technical issues related to the content to be described below, in addition to the technical issues discussed above.

SUMMARY OF THE INVENTION

The present disclosure has been made in an effort to appropriately distribute work points to prevent the excessive distribution from being concentrated on a specific robot, and distribute the work points to a plurality of task-performing robots to reduce the collision risk.

Meanwhile, a technical object to be achieved by the present disclosure is not limited to the above-mentioned technical object, and various technical objects can be included within the scope which is apparent to those skilled in the art from contents to be described below.

An exemplary embodiment of the present disclosure provides a method performed by a computing device. The method may include: determining available work points for each of a plurality of task-performing robots; distributing target work points for each of the plurality of task-performing robots based on the determined available work points, and predicting a plurality of target work trajectories for each of the plurality of task-performing robots based on the distributed target work points; calculating a first loss or a second loss based on the predicted plurality of target work trajectories; and re-distributing target work points to each of the plurality of task-performing robots based on at least one of the calculated first loss or the calculated second loss.

Alternatively, the determining of the available work points for each of the plurality of task-performing robots may include determining the available work points based on at least one of a posture, a position, or an entry of each of the plurality of task-performing robots.

Alternatively, the target work points may mean points at which each of the plurality of task-performing robots actually perform work among the determined available work points.

Alternatively, the process of distributing the target work points to each of the plurality of task-performing robots based on the determined available work points may include distributing the target work points so that a difference in number of target work points distributed to each of the plurality of task-performing robots is minimized based on the determined available work points.

Alternatively, the predicting of the plurality of target work trajectories for each of the plurality of task-performing robots based on the distributed target work points may include predicting shortest distance target work trajectories passing through all target work points distributed to each of the plurality of task-performing robots.

Alternatively, the calculating of the first loss or the second loss based on the predicted plurality of target work trajectories may include predicting a distance for each of the predicted plurality of target work trajectories, and calculating the first loss based on the distance for each the predicted plurality of target work trajectories, and the first loss may include at least one of a deviation loss or a station loss.

Alternatively, the calculating of the deviation loss may include applying a weight for a working hour to the distance for each of the predicted plurality of target work trajectories, calculating a standard deviation for distances for each of the plurality of target work trajectories to which the weight is applied, and calculating the deviation loss based on the calculated standard deviation.

Alternatively, the calculating of the station loss may include applying the weight for the working hour to the distance for each of the predicted plurality of target work trajectories, calculating a total sum of the distances for each of the plurality of target work trajectories to which the weight is applied, and calculating the station loss based on the calculated total sum of the distances.

Alternatively, the calculating of the first loss or the second loss based on the predicted plurality of target work trajectories may include predicting work areas for each of the plurality of task-performing robots based on the predicted plurality of target work trajectories, and calculating the second loss based on the predicted work areas.

Alternatively, the calculating of the second loss based on the predicted work areas may include calculating an area where two or more work areas among the predicted work areas for each of the plurality of task-performing robots cross, and calculating the second loss based on the crossing area.

Alternatively, the re-distributing of the target work points to each of the plurality of task-performing robots based on at least one of the calculated first loss or the calculated second loss may include calculating at least one of the first loss or the second loss as cost, and re-distributing the target work points to each of the plurality of task-performing robots to minimize the calculated cost by using a genetic algorithm.

Another exemplary embodiment of the present disclosure provides a computer program stored in a computer-readable storage medium. When the computer program is executed by one or more processors, the computer program may allow the one or more processors to perform operations for distributing work points to a plurality of task-performing robots, and the operation may include: an operation of determining available work points for each of the plurality of task-performing robots; an operation of distributing target work points for each of the plurality of task-performing robots based on the determined available work points, and predicting plurality of target work trajectories for each of the plurality of task-performing robots based on the distributed target work points; an operation of calculating a first loss or a second loss based on the predicted plurality of target work trajectories; and an operation of re-distributing target work points to each of the plurality of task-performing robots based on at least one of the calculated first loss or the calculated second loss.

Still another exemplary embodiment of the present disclosure provides a computing device. The computing device may include: at least one processor; and a memory, in which the processor may be configured to determine available work points for each of a plurality of task-performing robots, distribute target work points for each of the plurality of task-performing robots based on the determined available work points, and predict plurality of target work trajectories for each of the plurality of task-performing robots based on the distributed target work points, calculate a first loss or a second loss based on the predicted plurality of target work trajectories, and re-distribute target work points to each of the plurality of task-performing robots based on at least one of the calculated first loss or the calculated second loss.

According to an exemplary embodiment of the present disclosure, it is possible to appropriately distribute work points to prevent excessive distribution from being concentrated on a specific robot, and distribute the work points to plurality of task-performing robots to reduce a collision risk.

Meanwhile, the effects of the present disclosure are not limited to the above-mentioned effects, and various effects can be included within the scope which is apparent to those skilled in the art from contents to be described below.

DETAILED DESCRIPTION

Figure 1:
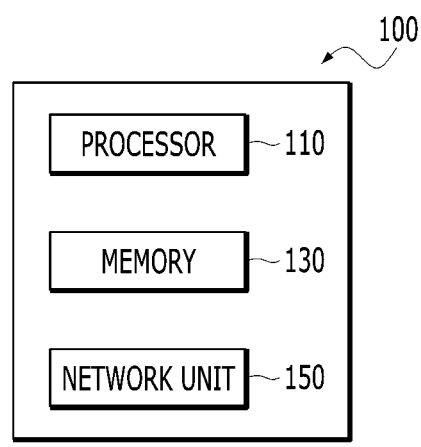
FIG. 1 is a block diagram of a computing device for distributing work points to a plurality of task-performing robots according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components.

One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally In terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for distributing work points to a plurality of task-performing robots according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for training the neural network. At least one of the CPU, GPGPU, and TPU of the processor 110 may process training of a network function. For example, both the CPU and the GPGPU may process the training of the network function and data classification using the network function. Further, in an exemplary embodiment of the present disclosure, processors of a plurality ofity of computing devices may be used together to process the training of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to an exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network unit 150 presented in the present disclosure may use various wireless communication systems such as code division multi access (CDMA), time division multi access (TDMA), frequency division multi access (FDMA), orthogonal frequency division multi access (OFDMA), single carrier-FDMA (SC-FDMA), and other systems.

In the present disclosure, the network unit 150 may be configured regardless of communication modes such as wired and wireless modes and constituted by various communication networks including a personal area network (PAN), a wide area network (WAN), and the like. Further, the network may be known World Wide Web (WWW) and may adopt a wireless transmission technology used for short-distance communication, such as infrared data association (IrDA) or Bluetooth. The techniques described in the present disclosure may also be used in other networks mentioned above.

Figure 2:
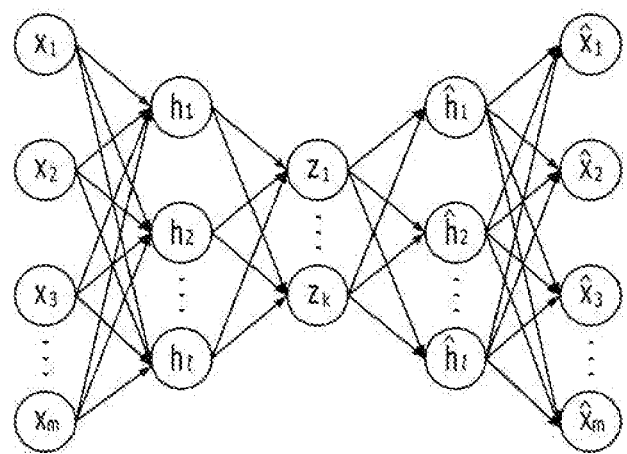
FIG. 2 is a schematic view illustrating a network function according to an exemplary embodiment of the present disclosure.

FIG. 2 is a conceptual view illustrating a neural network according to an exemplary embodiment of the present disclosure.

A neural network model according to the exemplary embodiment of the present disclosure may include a neural network for evaluating placement of the semiconductor device. Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality ofity of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be trained in at least one scheme of supervised learning, unsupervised learning, semi supervised learning, or reinforcement learning. The learning of the neural network may be a process in which the neural network applies knowledge for performing a specific operation to the neural network.

The neural network may be trained in a direction to minimize errors of an output. The training of the neural network is a process of repeatedly inputting training data into the neural network and calculating the output of the neural network for the training data and the error of a target and back-propagating the errors of the neural network from the output layer of the neural network toward the input layer in a direction to reduce the errors to update the weight of each node of the neural network. In the case of the supervised learning, the training data labeled with a correct answer is used for each training data (i.e., the labeled training data) and in the case of the unsupervised learning, the correct answer may not be labeled in each training data. That is, for example, the training data in the case of the supervised learning related to the data classification may be data in which category is labeled in each training data. The labeled training data is input to the neural network, and the error may be calculated by comparing the output (category) of the neural network with the label of the training data. As another example, in the case of the unsupervised learning related to the data classification, the training data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a training cycle (epoch). The learning rate may be applied differently according to the number of repetition times of the training cycle of the neural network. For example, in an initial stage of the training of the neural network, the neural network ensures a certain level of performance quickly by using a high learning rate, thereby increasing efficiency and uses a low learning rate in a latter stage of the training, thereby increasing accuracy.

In training of the neural network, the training data may be generally a subset of actual data (i.e., data to be processed using the trained neural network), and as a result, there may be a training cycle in which errors for the training data decrease, but the errors for the actual data increase. Overfitting is a phenomenon in which the errors for the actual data increase due to excessive training of the training data. For example, a phenomenon in which the neural network that trains a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the training data, regularization, dropout of omitting a part of the node of the network in the process of training, utilization of a batch normalization layer, etc., may be applied.

Figure 3:
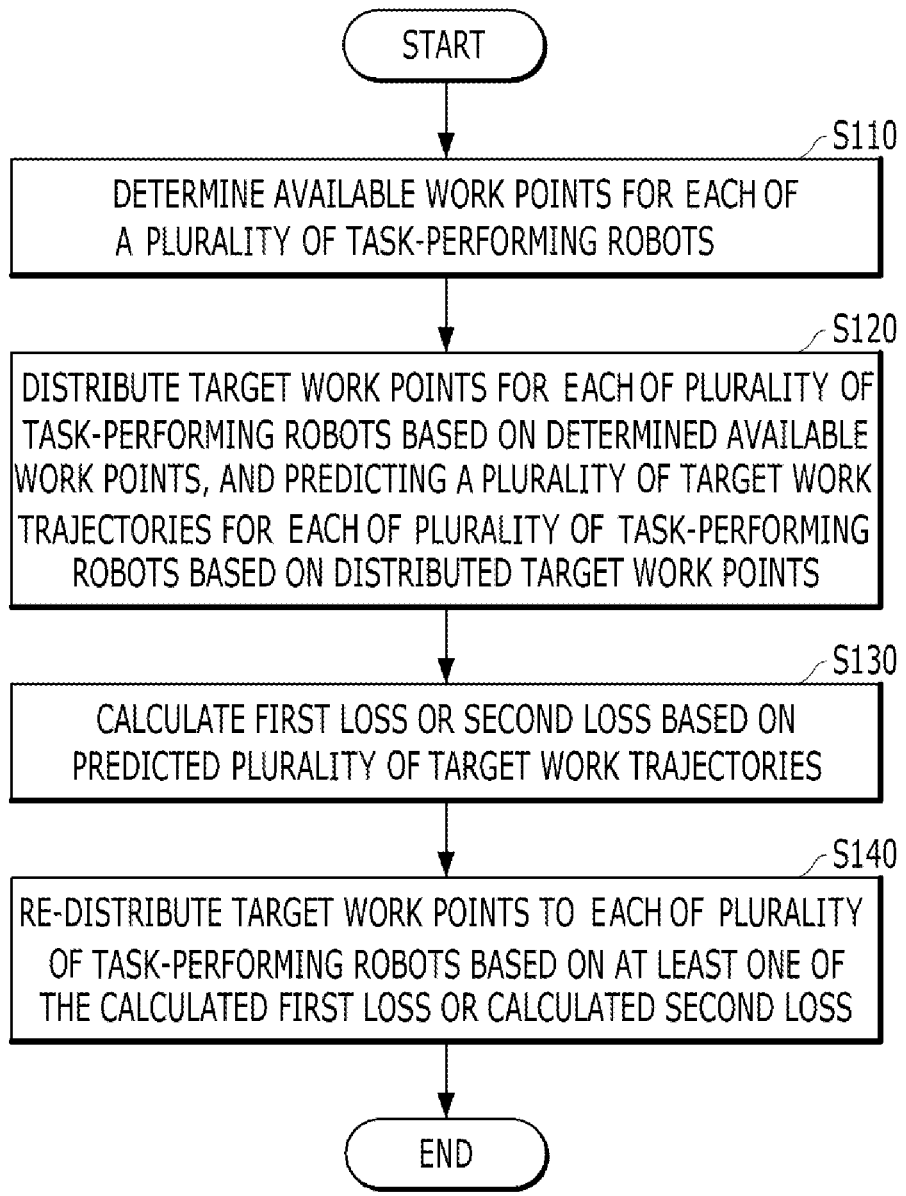
FIG. 3 is a flowchart illustrating a method for distributing work points to a plurality of task-performing robots according to an exemplary embodiment of the present disclosure.

FIG. 3 is a flowchart illustrating a method for distributing work points to a plurality of task-performing robots according to an exemplary embodiment of the present disclosure. A computing device 100 according to an exemplary embodiment of the present disclosure may directly acquire or receive, from an external system, "information for distributing work points to a plurality of task-performing robots". The external system may be a server or database that stores and manages the information for distributing the work points to the plurality of task-performing robots. The computing device 100 may use the information acquired directly or received from the external system as "input data for distributing the work points to the plurality of task-performing robots".

The computing device 100 may determine available work points for each of the plurality of task-performing robots (S110). For example, the computing device 100 may determine the available work points based on at least one of a posture, a position, or entry of each of the plurality of task-performing robots. Specifically, the computing device 100 may determine available work points at which a specific task-performing robot among the plurality of task-performing robots is capable of performing work based on at least one of the posture, the position, or the entry of each of the plurality of task-performing robots among the work points, and store the specific task-performing robot and the available work points as a data pair. A detailed description thereof will be described below with reference to FIG. 4 below.

The computing device 100 may distribute target work points for each of the plurality of task-performing robots based on the available work points determined through step S110, and predict a plurality of target work trajectories for each of the plurality of task-performing robots based on the distributed target work points (S120). In this case, the target work points may mean points at which each of the plurality of task-performing robots actually perform the work among the available work points determined through step S110. Additionally, the computing device 100 may distribute the target work points so that a difference in number of target work points distributed to each of the plurality of task-performing robots is minimized based on the determined available work points. For example, when the computing device 100 distributes the target work points to each of the plurality of task-performing robots, a genetic algorithm may be used. In this case, the computing device 100 may perform random initialization when determining an initial condition in order to use the genetic algorithm, but in this case, there is a problem in that it takes a long time to converge, and there may be a process which takes a significantly long time among every iteration. Additionally, the computing device 100 performs heuristic initialization of distributing the target work points so that a difference in number of target work points distributed to each of the plurality of task-performing robots is minimized based on the determined available work points when determining the initial condition to increase a convergence speed. A detailed description thereof will be described below with reference to FIG. 5 below.

According to another exemplary embodiment of the present disclosure, the computing device 100 may predict shortest distance target work trajectories passing through all target work points distributed to each of the plurality of task-performing robots. For example, when the target work points are distributed to each of the plurality of task-performing robots, in which order the work should be performed for the target work point should be determined, and this belongs to a traveling salesman problem (TSP) which is a problem which finds an order to visit all target work points at a shortest distance. Further, the computing device 100 should know a distance between the target work points in order to determine a visitation order for the target work point by using a TSP solver which is already present as a known technology in order to solve the traveling salesman problem (TSP). Meanwhile, the computing device 100 generates a plurality of candidate work trajectories for each of the plurality of task-performing robots by considering whether Cartesian move is possible, obstacle information, whether an interpolated trajectory can be generated, whether the work trajectory needs to be modified, etc., for two arbitrary points among the available work points for each of the plurality of task-performing robots, and predicts a distance between the generated plurality of candidate work trajectories to predict "the distance between two arbitrary points among the available work points". In this case, in the case of the Cartesian move, the task-performing robot may move linearly in/front/rear, up/down, and left/right directions with respect to two arbitrary points among the determined available work points, and the Cartesian move may mean a movement in which the task-performing robot moves within three motion axes of x, y, and z, and the interpolated trajectory may mean a trajectory in which the obstacle information is disregarded for two arbitrary points among the determined available work points, and a rotating operation and a joint limit of the task-performing robot are considered, and in the interpolated trajectory, since the rotating operation and the joint limit of the task-performing robot may be considered, when "a distance of a trajectory between two available work points which are close to each other or spaced apart from each other by an intermediate distance" is predicted, the distance of the trajectory between two available work points may be predicted more accurately than a Euclidean distance. Further, the distance between the target work points may be predicted based on "a prediction result of the distance between two arbitrary points among the available work points". Accordingly, the computing device 100 may predict a distance between the target work points distributed to each of the plurality of task-performing robots, easily determine the visitation order between the distributed target work points by using the TSP solver which is already present based on the predicted distance, and predict the shortest-distance target work trajectories passing through all of the target work points distributed to each of the plurality of task-performing robots based on the determined visitation order. A detailed description of the process of predicting the shortest-distance target work trajectories passing through all of the target work points distributed to each of the plurality of task-performing robots will be described below with reference to FIG. 6 below.

The computing device 100 may calculate a first loss or a second loss based on the plurality of target work trajectories predicted through step S120 (S130).

According to an exemplary embodiment of the present disclosure, the computing device 100 may predict a distance for each of the plurality of target work trajectories predicted through step S120, and calculate the first loss based on the predicted distance for each of the plurality of target work trajectories. In this case, the first loss may include at least one of a deviation loss or a station loss.

The computing device 100 may apply "a weight for a working hour" to "the predicted distance for each of the plurality of target work trajectories", calculate a standard deviation of "distances for each of the plurality of target work trajectories to which the weight is applied", and calculate the deviation loss based on the calculated standard deviation. In addition, the computing device 100 may apply "the weight for the working hour" to "the predicted distance for each of the plurality of target work trajectories", calculate "a total sum of the distances for each of the plurality of target work trajectories to which the weight is applied", and calculate the station loss based on the calculated total sum of the distances. In this case, the working hour may include a working hour limit or a cycle time for each work station. A detailed description of the process of calculating the deviation loss or the station loss based on the predicted distance for each of the plurality of target work trajectories will be described below with reference to FIG. 7 below.

Meanwhile, according to another exemplary embodiment of the present disclosure, the computing device 100 may predict works areas for each of the plurality of task-performing robots based on the plurality of target work trajectories predicted through step S120, and calculate a second loss based on the predicted work areas. Specifically, the computing device 100 may calculate an area where two or more work areas among the predicted work areas for each of the plurality of task-performing robots cross, and calculate the second loss based on the crossing area. A detailed process of calculating the second loss based on the predicted work areas will be described below with reference to FIG. 8 below.

The computing device 100 may re-distribute target work points to each of a plurality of task-performing robots based on at least one of the first loss or the second loss calculated through step S120 (S130). For example, the computing device 100 may calculate at least one of the first loss or the second loss as cost, and re-distribute the target work points to each of the plurality of task-performing robots to minimize the calculated cost by using a genetic algorithm. The genetic algorithm may mean an algorithm that acquires an optimal solution by imitating an evolution of living things. However, the description of the genetic algorithm is not limited to the example, and the genetic algorithm known as known technology may be used in the process of solving a problem of re-distributing the target work points to each of the plurality of task-performing robots. A detailed process in which the computing device 100 re-distributes the target work points to each of the plurality of task-performing robots by using the genetic algorithm will be described below with reference to FIG. 9 below.

Figure 4:
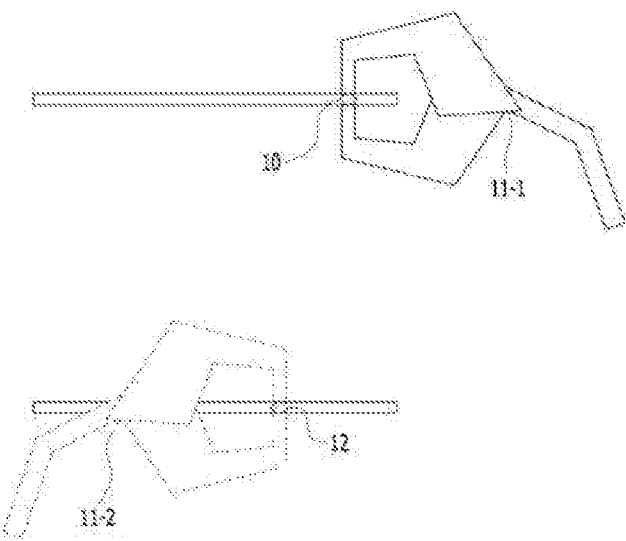
FIG. 4 is a schematic view for describing a process of determining available work points for each of a plurality of task-performing robots according to an exemplary embodiment of the present disclosure.

FIG. 4 is a schematic view for describing a process of determining available work points for each of a plurality of task-performing robots according to an exemplary embodiment of the present disclosure.

The computing device 100 may determine available work points 10 at which working is possible based on at least one of the posture, the position, or the entry of each of the plurality of task-performing robots among the work points, and store a specific task-performing robot and "available work points of the specific task-performing robot" as a data pair. For example, the task-performing robot may include a robot that performs welding, and work points may include welding points. In this case, referring to FIG. 4, when the work point is a position of a first welding point 10, the task-performing robot is capable of entering up to the first welding point 10 at a workable posture 11-1, and may be present at a position at which the working is possible with respect to the first welding point 10, so the first welding point 10 may be determined as the available work point. On the contrary, when the work point is a position of a second welding point 12, there is no posture of the task-performing robot capable of performing the work (11-2), the task-performing robot is incapable of entering up to the second welding point 12, and there is no position at which the working is possible with respect to the second welding point 12, so the second welding point 12 may be not determined as the available work point. Additionally, there may be a limit in length or rotation in a robot arm and a robot joint of the task-performing robot. Therefore, even when the welding points 10 and 12 are too distant from the task-performing robot, it is impossible to perform the work, so the welding points 10 and 12 may be not determined as the available work points.

Meanwhile, according to an exemplary embodiment of the present disclosure, the computing device 100 determines "available work points 10 at which each of the plurality of task-performing robots are capable of performing the work among the work points" based on at least one of the posture, the position, or the entry of each of the plurality of task-performing robots to reduce an input space and a search space when calculating the work trajectory of the task-performing robot. Further, a specific task-performing robot among the plurality of task-performing robots and "the available work points of the specific task-performing robot" are stored as a data pair, so when the computing device 100 uses the genetic algorithm, the genetic algorithm may be used in the process of corresponding task-performing robots capable of performing the work to the specific task-performing robot. However, the welding points 10 and 12 are just an example for describing the available work points, which are not limited to the welding point, and points at which various works are performed may be included in the available work points.

A process of distributing the target work points to each of the plurality of task-performing robots based on the determined available work points will be described below with reference to FIG. 5 below.

Figure 5:
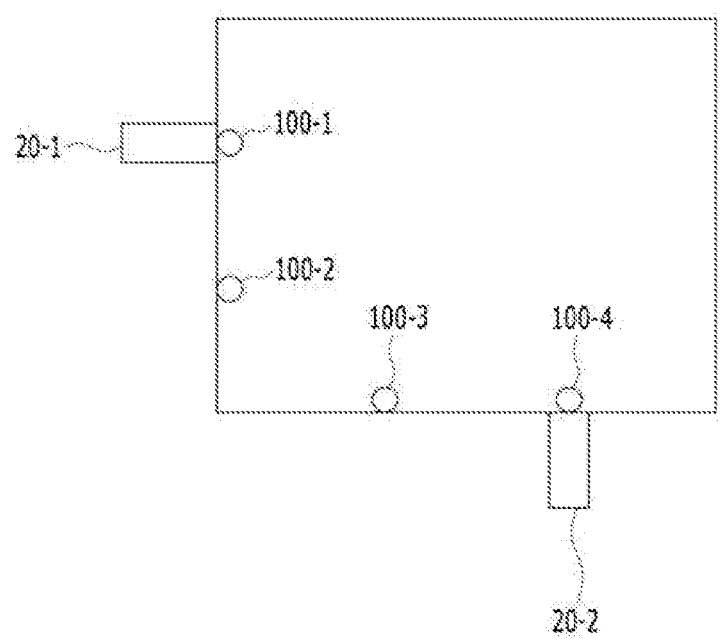
FIG. 5 is a schematic view for describing a process of distributing target work points to each of a plurality of task-performing robots based on the determined available work points according to an exemplary embodiment of the present disclosure.

FIG. 5 is a schematic view for describing a process of distributing target work points to each of a plurality of task-performing robots based on the determined available work points according to an exemplary embodiment of the present disclosure.

Referring to FIG. 5, the computing device 100 may distribute the target work points to a plurality of task-performing robots 20-1 and 20-2, respectively based on the determined available work points 100-1 to 100-4. In this case, the target work points may mean points at which each of the plurality of task-performing robots 20-1 and 20-2 actually perform the work among the determined available work points. For example, when the computing device 100 distributes the target work points to each of the plurality of task-performing robots, the genetic algorithm may be used. In this case, the computing device 100 may perform random initialization when determining an initial condition (for example, the target work points distributed to each of the plurality of task-performing robots) in order to use the genetic algorithm, but in this case, there is a problem in that it takes a long time to converge, and there may be a process which takes a significantly long time among every iteration. Meanwhile, an object to be solved by the present disclosure is to appropriately distribute work points to prevent the excessive distribution from being concentrated on a specific robot, and distribute the work points to a plurality of task-performing robots to reduce the collision risk, so if the computing device 100 designates the initial condition to prevent the excessive distribution from being concentrated on the specific robot before solving the problem by using the genetic algorithm, a convergence speed may be increased, and a possibility that an optimal point will not be able to be found may be reduced. Based thereon, according to an exemplary embodiment of the present disclosure, the computing device 100 may distribute the target work points so as to minimize a difference in number of target work points distributed to each of the plurality of task-performing robots 20-1 and 20-2 based on the determined available work points 100-1 to 100-4. For example, in FIG. 5, when the available work points 100-1 to 100-4 determined for a first task-performing robot 20-1 and a second task-performing robot 20-2, respectively are the same as each other, the computing device 100 may distribute two points (for example, 100-1 and 100-2) among the available work points 100-1 to 100-4 to the first task-performing robot 20-1, and the remaining two points (for example, 100-3 and 100-4) to the second task-performing robot 20-2 as the target work points. Specifically, the computing device 100 may distribute the target work points so as to minimize a difference (0 in the example of FIG. 5) in number of target work points distributed to the first task-performing robot 20-1 and the second task-performing robot 20-2, respectively. Therefore, the computing device 100 distributes the target work points so as to minimize the difference in number of target work points distributed to each of the plurality of task-performing robots to increase the convergence speed and reduce the possibility that the optimal point will not be able to be found. However, in addition to the example, as various examples, the initial condition (for example, the target work points distributed to the plurality of task-performing robots, respectively) may be determined by heuristic initialization (for example, an example in which a condition of re-distributing the target work points distributed to the plurality of task-performing robots, respectively is designated as an initial value). Meanwhile, a detailed description of the process of predicting the shortest-distance target work trajectories passing through all of the target work points distributed to the plurality of task-performing robots 20-1 and 20-2, respectively will be described below with reference to FIG. 6 below.

Figure 6:
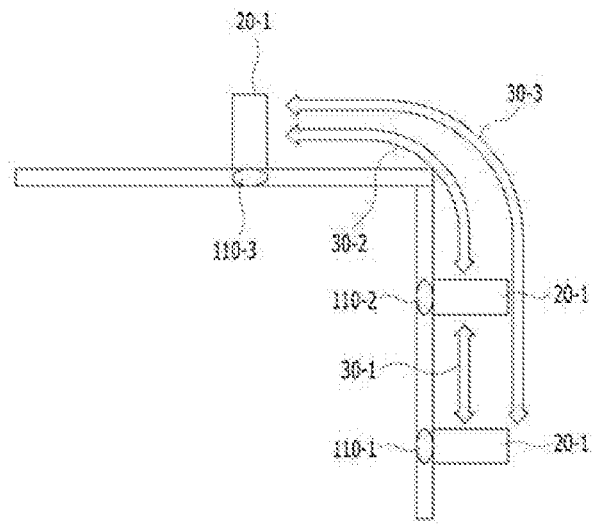
FIG. 6 is a schematic view illustrating a process of predicting shortest distance target work trajectories passing through all target work points distributed to each of the plurality of task-performing robots according to the exemplary embodiment of the present disclosure.

FIG. 6 is a schematic view illustrating a process of predicting shortest distance target work trajectories passing through all target work points distributed to each of the plurality of task-performing robots according to the exemplary embodiment of the present disclosure.

According to an exemplary embodiment of the present disclosure, the computing device 100 may predict shortest distance target work trajectories passing through all target work points 110-1, 110-2, and 110-3 distributed to each of the plurality of task-performing robots (20-1 in the example of FIG. 6). In this case, the target work point may mean a point at which the task-performing robot actually performs the work among the determined available work points. Meanwhile, when the target work points 110-1, 110-2, and 110-3 are distributed to each of the plurality of task-performing robots, in which order the work should be performed for the target work points 110-1, 110-2, and 110-3 should be determined, and this belongs to a traveling salesman problem (TSP) which is a problem of finding an order to visit all target work points at a shortest distance. Further, the computing device 100 should know a distance between the target work points in order to determine a visitation order for the target work points 110-1, 110-2, and 110-3 by using a TSP solver which is already present as a known technology. Meanwhile, the computing device 100 generates a plurality of candidate work trajectories for each of the plurality of task-performing robots by considering whether Cartesian move is possible, obstacle information, whether an interpolated trajectory can be generated, whether the work trajectory needs to be modified, etc., for two arbitrary points among the available work points for each of the plurality of task-performing robots, and predicts a distance between the generated plurality of candidate work trajectories to predict "the distance between two arbitrary points among the available work points". In this case, in the case of the Cartesian move, the task-performing robot may move linearly in/front/rear, up/down, and left/right directions with respect to two arbitrary points among the determined available work points, and the Cartesian move may mean a movement in which the task-performing robot moves within three motion axes of x, y, and z, and the interpolated trajectory may mean a trajectory in which the obstacle information is disregarded for two arbitrary points among the determined available work points, and a rotating operation and a joint limit of the task-performing robot are considered, and in the interpolated trajectory, since the rotating operation and the joint limit of the task-performing robot may be considered, when "a distance of a trajectory between two available work points which are close to each other or spaced apart from each other by an intermediate distance" is predicted, the distance of the trajectory between two available work points may be predicted more accurately than a Euclidean distance.

Referring to FIG. 6, the distance between the target work points 110-1, 110-2, and 110-3 may be predicted based on "a prediction result of the distance between two arbitrary points among the available work points". Accordingly, the computing device 100 may predict a distance 30-1, 30-2, and 30-3 between the target work points distributed to each of the plurality of task-performing robots, easily determine the visitation order between the distributed target work points 110-1, 110-2, and 110-3 by using the TSP solver which is already present based on the predicted distance 30-1, 30-2, and 30-3 between the target work points, and predict the shortest-distance target work trajectories passing through all of the target work points distributed to each of the plurality of task-performing robots based on the determined visitation order. Specifically, since the distance 30-1, 30-2, and 30-3 between the target work points 110-1, 110-2, and 110-3 is predicted, the computing device 100 may find an order to visit all target work points at a shortest distance by using the TSP solver which is already present as known technology. In this case, since a sum of the distances 30-1 and 30-2 between the target work points 110-1, 110-2, and 110-3 is a shortest distance among combinations (in detail, a sum of two distances among the distance 30-1, the distance 30-2, or the distance 30-3) of the predicted distances, the visitation order between the target work points may be determined as an order of "first target work point 110-1->second target work point 110-2->third target work point 110-3" or "third target work point 110-3->second target work point 110-2->first target work point 110-1". Through this, the computing device 100 may predict shortest distance target work trajectories (a trajectory of working in the order of 110-1->110-2->110-3 and a trajectory of working in the order of 110-3->110-2->110-1) passing through all target work points 110-1, 110-2, and 110-3 distributed to each of the plurality of task-performing robots (20-1 in the example of FIG. 6). However, the target work points 110-1, 110-2, and 110-3 and the predicted distances 30-1, 30-2, and 30-3 are just examples, and are not limited thereto.

Meanwhile, a detailed process of predicting a distance for each of the predicted plurality of target work trajectories, and calculating a first loss based on the distance for each of the predicted plurality of target work trajectories will be described below with reference to FIG. 7 below.

Figure 7:
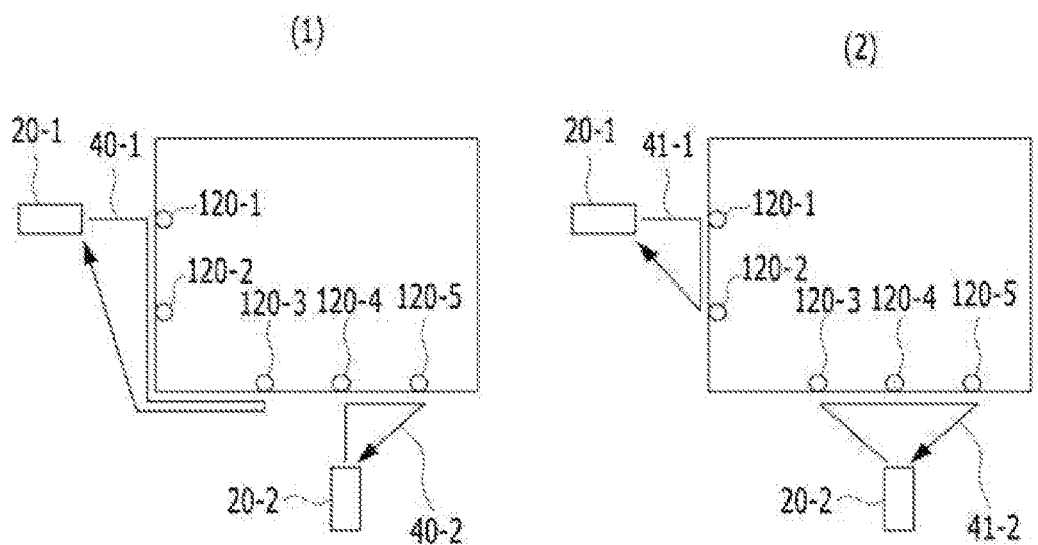
FIG. 7 is a schematic view illustrating a process of predicting a distance for each of the predicted plurality of target work trajectories, and calculating a first loss based on the distance for each of the predicted plurality of target work trajectories according to an exemplary embodiment of the present disclosure.

FIG. 7 is a schematic view illustrating a process of predicting a distance for each of the predicted plurality of target work trajectories, and calculating a first loss based on the distance for each of the predicted plurality of target work trajectories according to an exemplary embodiment of the present disclosure.

According to an exemplary embodiment of the present disclosure, the computing device 100 may predict a distance for each of predicted plurality of target work trajectories.

For example, in the case of (1) of FIG. 7, there are three target work points 120-1, 120-2, and 120-3 distributed to the first task-performing robot 20-1, and there are two target work points 120-4 and 120-5 distributed to the second task-performing robot 20-2. In this case, as described in FIG. 6 above, the computing device 100 may predict a 1-1st target work trajectory 40-1 of the first task-performing robot 20-1 and a 2-1st target work trajectory 40-2 of the second task-performing robot 20-2. Further, the computing device 100 may predict a distance for each of the predicted plurality of target work trajectories 40-1 and 40-2.

Meanwhile, in the case of (2) of FIG. 7, there are two target work points 120-1 and 120-2 distributed to the first task-performing robot 20-1, and there are three target work points 120-3, 120-4, and 120-5 distributed to the second task-performing robot 20-2. In this case, as described in FIG. 6 above, the computing device 100 may predict a 1-2nd target work trajectory 41-1 of the first task-performing robot 20-1 and a 2-2nd target work trajectory 41-2 of the second task-performing robot 20-2. Further, the computing device 100 may predict the distance for each of the predicted plurality of target work trajectories 41-1 and 41-2.

Additionally, the computing device 100 may calculate a first loss based on the distance for each of the predicted plurality of target work trajectories. In this case, the first loss may include at least one of a deviation loss or a station loss. Meanwhile, the station may include a plurality of stations, and each of the plurality of stations may include one or more task-performing robots, and each task-performing robot may be expressed as (what order of station a station in which each task-performing robot is present is or what order of task-performing robot in each station each task-performing robot is). Specifically, each task-performing robot may be expressed as follows.

Specific task-performing robot among a plurality of task-performing robots=$r_{ij}$ In this case, r may mean the task-performing robot, i may mean what order of station a station in which a specific task-performing robot is present is, and j may mean what order of task-performing robot in each station the specific task-performing robot is. For example, in FIG. 7, when the first task-performing robot 20-1 and the second task-performing robot 20-2 are present in a first station, a task-performing robot $r_{00}$ may mean the first task-performing robot 20-1 which is present in the first station, and is a first task-performing robot of the first station.

Meanwhile, the computing device 100 may apply "a weight for a working hour" to "the predicted distance for each of the plurality of target work trajectories", calculate "distances for each of the plurality of target work trajectories to which the weight is applied", and calculate the deviation loss based on "distances for each of a plurality of target work trajectories to which the weight is applied. In this case, the working hour may include a working hour limit or a cycle time for each work station. For example, in FIG. 7, the computing device 100 applies the weight for the working hour to distances predicted for the plurality of target work trajectories 40-1, 40-2, 41-1, 41-2, respectively to calculate "a distance to which the weight for the working hour is applied".

Specifically, in (1) of FIG. 7, the computing device 100 may predict a distance for the 1-1st target work trajectory 40-1, measure a first working hour for which the first task-performing robot 20-1 works along the 1-1st target work trajectory 40-1, and multiply the measured first working hour and the distance for the 1-1st target work trajectory 40-1 to calculate "a distance of the 1-1st target work trajectory 40-1 to which the weight for the working hour is applied". Meanwhile, Equation 1 of calculating 'the distance for each of the plurality of target work trajectories to which the weight is applied" by the computing device 100 may be expressed as follows.

Distance of target work trajectory to which weight of robot $r_{ij}$ is applied=$w_{ij}c_{ij}$       [Equation 1]

In Equation 1, $c_{ij}$ may mean a distance predicted for the target work trajectory of a j-th task-performing robot $r_{ij}$ in an i-th station, and $w_{ij}$ may mean a hour required for the task-performing robot $r_{ij}$ to perform work along the trajectory $c_{ij}$. Accordingly, $w_{ij}c_{ij}$ may mean "a distance of the target work trajectory to which the weight for the working hour is applied" of a specific task-performing robot $r_{ij}$.

For example, in (1) of FIG. 7, when the first task-performing robot 20-1 and the second task-performing robot 20-2 are present in a first station, $c_{00}$ may mean a distance predicted for the target work trajectory 40-1 of the first task-performing robot $r_{00}$ 20-1, $w_{00}$ may mean a hour required for the first task-performing robot $r_{00}$ 20-1 to perform the work along the target work trajectory 40-1, and $w_{00}c_{00}$ may mean "the distance of the 1-1st target work trajectory 40-1 to which the weight for the working hour is applied" of the first task-performing robot 20-1.

Accordingly, "a distance of the 2-1st target work trajectory 40-2 to which the weight for the working hour is applied", "a distance of the 1-2nd target work trajectory 41-1 to which the weight for the working hour is applied", and "a distance of the 2-2nd target work trajectory 41-2 to which the weight for the working hour is applied" may be calculated through Equation 1 of calculating the "distance of the 1-1st target work trajectory 40-1 to which the weight for the working hour is applied" in (1) of FIG. 7 above. Further, the computing device 100 may calculate the first loss based on "the distance for each of the plurality of target work trajectories to which the weight is applied". In this case, the first loss may include at least one of a deviation loss or a station loss.

According to another exemplary embodiment of the present disclosure, the computing device 100 may calculate a standard deviation for "the distance for each of the plurality of target work trajectories to which the weight is applied", and calculate the deviation loss based on the calculated standard deviation. Specifically, the deviation loss may be calculated through Equation 2 below.

$$\text{Deviation loss} = \sqrt{\frac{\sum(w_{ij}c_{ij} - \overline{wc})^2}{n}}$$       [Equation 2]

In Equation 2, $\overline{wc}$ may mean an average of "the distances for each of the plurality of target work trajectories to which the weight is applied", $w_{ij}c_{ij}$ may mean "a distance of a target work trajectory to which the weight for the working hour is applied" of a specific task-performing robot $r_{ij}$, and n may mean the total number of task-performing robots.

The deviation loss calculated through Equation 2 above may mean a standard deviation of "distances of a plurality of target work trajectories to which the weight is applied" of a total of respective task-performing robots. Accordingly, when the deviation loss is small, the standard deviation of "the distances for the plurality of target work trajectories to which the weight is applied" of each of the plurality of task-performing robots is small, so work points are well distributed to the plurality of task-performing robots not to be biased. On the contrary, when the deviation loss is large, the standard deviation of "the distances for the plurality of target work trajectories to which the weight is applied" of each of the plurality of task-performing robots is large, so the work points are distributed to the plurality of task-performing robots to be biased, and accordingly, the work points may be required to be re-distributed to the plurality of task-performing robots. Accordingly, the computing device 100 may determine whether the work points are appropriately distributed to the plurality of task-performing robots not to be biased by using the deviation loss, and re-distributes the work points to the plurality of task-performing robots in order to reduce the deviation loss to appropriately distribute the work points to the plurality of task-performing robots not to be biased.

According to another exemplary embodiment of the present disclosure, the computing device 100 may apply "the weight for the working hour" to "the predicted distance for each of the plurality of target work trajectories", calculate "a total sum of the distances for each of the plurality of target work trajectories to which the weight is applied", and calculate the station loss based on the calculated total sum of the distances. For example, the station loss may be calculated through Equation 3 below.

$$\text{Station loss} = \frac{1}{N}\sum(w_{ij}c_{ij})$$       [Equation 3]

In Equation 3, $\Sigma\Box w_{ij}c_{ij}$ may mean a total sum of "the distances for each of the plurality of target work trajectories to which the weight is applied", $w_{ij}c_{ij}$ may mean "a distance of a target work trajectory to which the weight for the working hour is applied" of a specific task-performing robot $r_{ij}$, and N may mean the total number of task-performing stations or the total number of task-performing robots.

The station loss calculated through Equation 3 above may mean an average of "the distances of a plurality of target work trajectories to which the weight is applied" of the plurality of task-performing robots which are present for each task-performing station. In this case, since N is a predetermined number, the station loss is eventually influenced by the total sum of "the distances of each of the plurality of target work trajectories to which the weight is applied". Accordingly, when the station loss is small, the total sum of "the distances of each of the plurality of target work trajectories to which the weight is applied" is small, so the target work points distributed to the plurality of task-performing robots, respectively are distributed to perform the work within a small time. On the contrary, when the station loss is large, the total sum of "the distances of each of the plurality of target work trajectories to which the weight is applied" is large, so the plurality of task-performing robots are distributed to perform the work for the target work points distributed thereto, respectively for a longer time than the case where the station loss is small.

Accordingly, when the station loss is large, the plurality of task-performing robots are distributed to perform the work for the target work points distributed thereto, respectively for a longer time than the case where the station loss is small, so the plurality of task-performing robots may be required to be re-distributed. Accordingly, the computing device 100 may determine whether the plurality of task-performing robots are well distributed to complete the work for the target work points distributed within an appropriate time by using the station loss, and re-distributes the work points to the plurality of task-performing robots in order to reduce the station loss to well distribute the plurality of task-performing robots to complete the work for the work points distributed within a short time.

For example, when FIG. 7 is the first station, "the distance of the 1-1st target work trajectory 40-1 to which the weight for the working hour is applied" of the first task-performing robot 20-1 may be calculated as $w_{00}c_{00}$, and "the distance of the 2-1st target work trajectory 40-2 to which the weight for the working hour is applied" of the second task-performing robot 20-2 may be calculated as $w_{00}c_{00}$. Further, "the distance of the 1-2nd target work trajectory 41-1 to which the weight for the working hour is applied" of the first task-performing robot 20-1 may be calculated as $w_{00}'c_{00}'$, and "the distance of the 2-1st target work trajectory 41-2 to which the weight for the working hour is applied" of the second task-performing robot 20-2 may be calculated as $w_{01}'c_{01}'$.

In this case, the case of (1) and the case of (2) of FIG. 7 may be compared in terms of the deviation loss and the station loss. Specifically, comparison may be made like $(w_{00}c_{00}+w_{00}c_{00})>(w_{00}'c_{00}'+w_{01}'c_{01}')$, so the station loss of (1) may be larger than the station loss of (2), and the deviation loss of (1) may be larger than the deviation loss of (2) in FIG. 7. Accordingly, it may be determined that the work points are distributed to the plurality of task-performing robots not to be biased in the case of (2) as compared with the case of (1) of FIG. 7, and appropriately distributed to complete the work for the work points distributed within a short time. However, multiple task-performing robots may be disposed in one task-performing station, work areas may be overlapped between the task-performing robots according to how the task-performing point is distributed to each task-performing robot, and the overlapped work area may then delay an operation of another robot in order to prevent a collision between the task-performing robots. Therefore, the computing device 100 may predict the work areas for each of the plurality of task-performing robots, and calculate the second loss based on the predicted work areas, and a detailed process will be described below with reference to FIG. 8 below.

Figure 8:
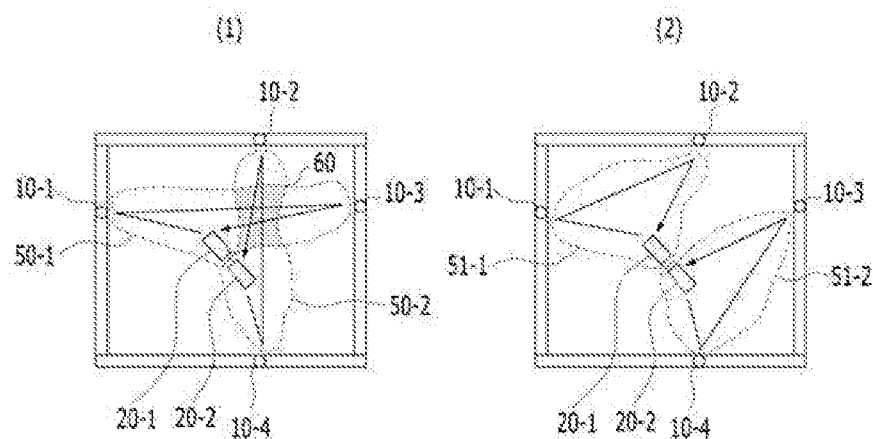
FIG. 8 is a schematic view for describing a process of predicting work areas for each of the plurality of task-performing robots based on the predicted plurality of target work trajectories, and calculating a second loss based on the predicted work areas according to an exemplary embodiment of the present disclosure.

FIG. 8 is a schematic view for describing a process of predicting work areas for each of the plurality of task-performing robots based on the predicted plurality of target work trajectories, and calculating a second loss based on the predicted work areas according to an exemplary embodiment of the present disclosure.

Multiple task-performing robots may be disposed in one task-performing station, work areas may be overlapped between the task-performing robots according to how the task-performing point is distributed to each task-performing robot, and the overlapped work area may then delay an operation of another robot in order to prevent a collision between the task-performing robots. In this case, even though each task-performing robot visits a given task-performing point within a small time, there is a risk of exceeding a time assigned per task-performing station due to occurrence of a series of waiting.

Accordingly, the computing device 100 may predict work areas 50-1, 50-2, 51-1, and 51-2 for the plurality of task-performing robots 20-1 and 20-2, respectively based on the predicted plurality of target work trajectories, and calculate a second loss based on the predicted work areas 50-1, 50-2, 51-1, and 51-2. For example, in FIG. 8, available work points 10-1 to 10-4 may be distributed to the target works by two for each of the plurality of task-performing robots 20-1 and 20-2, and a plurality of target work trajectories for each of the plurality of task-performing robots 20-1 and 20-2 may be predicted based on the distributed target work points. Specifically, in (1) of FIG. 8, the first task-performing robot 20-1 may be distributed with a first work point 10-1 and a third work point 10-3 as the target work point, the second task-performing robot 20-2 may be distributed with a second work point 10-2 and a fourth work point 10-4 as the target work point, and the first task-performing robot 20-1 may perform work on a first target work trajectory ("first work point 10-1->third work point 10-3"), and the second task-performing robot 20-2 may perform work on a second target work trajectory ("fourth work point 10-4->second work point 10-2"). Specifically, in (2) of FIG. 8, the first task-performing robot 20-1 may be distributed with the first work point 10-1 and the second work point 10-2 as the target work point, the second task-performing robot 20-2 may be distributed with the third work point 10-3 and the fourth work point 10-4 as the target work point, and the first task-performing robot 20-1 may perform work on a third target work trajectory ("first work point 10-1->second work point 10-2"), and the second task-performing robot 20-2 may perform work on a fourth target work trajectory ("fourth work point 10-4->third work point 10-3").

In this case, the computing device 100 may move each of the plurality of task-performing robots 20-1 and 20-2 based on the predicted plurality of target work trajectories (first to fourth target work trajectories) on a 3D space expressed as voxel, express a space occupied while moving by each of the plurality of task-performing robots 20-1 and 20-2 as volume information, and predict the volume information expressed for each of the plurality of task-performing robots as the work areas 50-1, 50-2, 51-1, and 51-2 for each of the plurality of task-performing robots. However, the volume information used for predicting the work areas for each of the plurality of task-performing robots is just an example, and various technologies are used to predict the work areas.

The computing device 100 may calculate the second loss based on the predicted work areas 50-1, 50-2, 51-1, and 51-2. For example, in (1) of FIG. 8, the computing device 100 may calculate an area 60 where two or more work areas among the predicted work areas 50-1 and 50-2 for each of the plurality of task-performing robots 20-1 and 20-2 cross, and calculate the second loss based on the crossing area 60. In this case, the second loss may be calculated as the number of areas 60 where two or more work areas cross, and in the case of (1) of FIG. 8, since the number of areas 60 where two or more work areas cross is 1, the second loss may be calculated as 1. On the contrary, in the case of (2) of FIG. 8, there is no area where two or more work areas cross among the predicted work areas 51-1 and 51-2 for the plurality of task-performing robots 20-1 and 20-2, respectively. Accordingly, in the case of (2) of FIG. 8, since the number of areas where two or more work areas cross is 0, the second loss may be calculated as 0. If "the deviation loss and the station loss in (1) of FIG. 8" and "the deviation loss and the station loss in (2) of FIG. 8" are the same, the computing device 100 may distribute the target work points to the plurality of task-performing robots like the case of (2) of FIG. 8 because "the second loss in (2) of FIG. 8" is smaller than the calculated "second loss in (1) of FIG. 8". Accordingly, the computing device 100 may distribute task-performing points so as to reduce the collision risk by considering how many work area overlaps between the task-performing robots in the task-performing station the corresponding distribution generates by considering the second loss when distributing the target work points to the plurality of task-performing robots. Meanwhile, the computing device 100 may re-distribute target work points to each of the plurality of task-performing robots based on at least one of the calculated first loss or the calculated second loss, and the genetic algorithm may be used in this process. A detailed description thereof will be described below with reference to FIG. 9 below.

Figure 9:
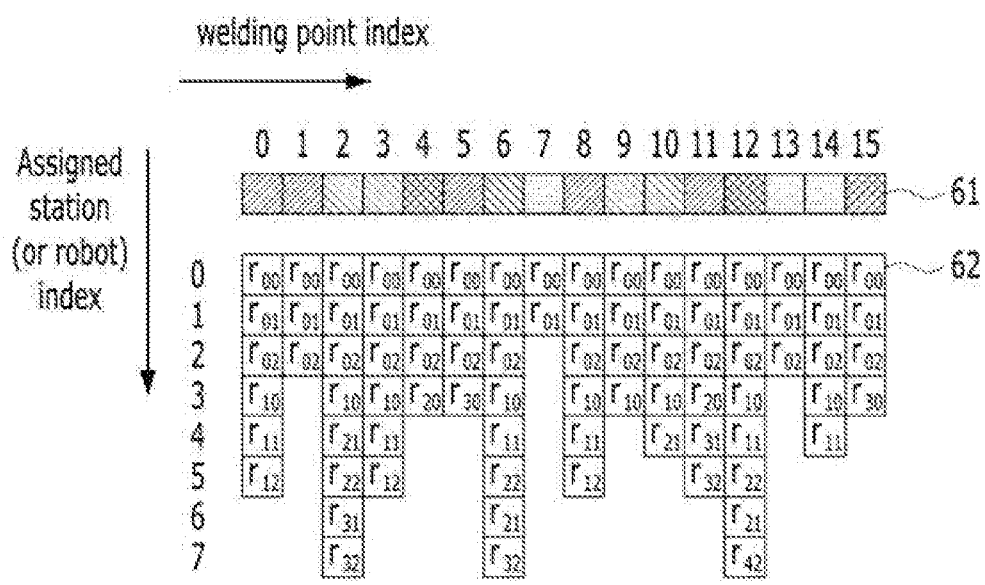
FIG. 9 is a schematic view for describing a process of calculating at least one of the first loss or the second loss as cost, and re-distributing target work points to each of the plurality of task-performing robots to minimize the calculated cost by using a genetic algorithm according to an exemplary embodiment of the present disclosure.

FIG. 9 is a schematic view for describing a process of calculating at least one of the first loss or the second loss as cost, and re-distributing the target work points to each of the plurality of task-performing robots to minimize the calculated cost by using a genetic algorithm according to an exemplary embodiment of the present disclosure.

The computing device 100 may re-distribute target work points to each of a plurality of task-performing robots based on at least one of the calculated first loss or the calculated second loss. For example, the computing device 100 may calculate at least one of the first loss or the second loss as cost, and re-distribute the target work points to each of the plurality of task-performing robots to minimize the calculated cost by using a genetic algorithm. The genetic algorithm may mean an algorithm that acquires an optimal solution by imitating an evolution of living things. For example, in the example of FIG. 9, the task-performing point may include a welding point, and the total number of task-performing points (in the example, the number of welding points) is 16, and the total number of task-performing stations is 4. In this case, a list 62 of a task-performing robot corresponding to a specific task-performing point may be disclosed, and in the list 62 of the task-performing robot, r may mean the robot, i may mean what order of station a station in which a specific task-performing robot is present is, and j may mean what order of task-performing robot in each station the specific task-performing robot is. Further, since the specific task-performing robot and "the available work points of the specific task-performing robot" are stored as the data pair through the example of FIG. 4 above, task-performing robots may be known which correspond to each task-performing point. For example, in FIG. 9, in the case of welding point #16, the work may be performed by four task-performing robots $r_{00}$, $r_{01}$, $r_{02}$, and $r_{30}$, and the $r_{00}$, $r_{01}$, $r_{02}$, and $r_{30}$ may be written as a gene.

Meanwhile, referring to FIG. 9, the computing device 100 selects one corresponding task-performing robot in the list 62 (i.e., a gene list) of the task-performing robot for each task-performing point to configure a chromosome 61.

For example, a first chromosome may be configured in a form of ($r_{00}$, $r_{00}$, $r_{00}$, $r_{00}$, $r_{00}$, $r_{00}$, $r_{00}$, $r_{00}$, $r_{00}$, $r_{00}$, $r_{00}$, $r_{00}$, $r_{00}$, $r_{10}$, $r_{00}$, $r_{00}$), and a second chromosome may be configured in a form of ($r_{01}$, $r_{01}$, $r_{01}$, $r_{01}$, $r_{01}$, $r_{01}$, $r_{01}$, $r_{01}$, $r_{01}$, $r_{01}$, $r_{01}$, $r_{01}$, $r_{01}$, $r_{11}$, $r_{01}$, $r_{01}$).

However, the first and second chromosome are just an example, and one corresponding task-performing robot is selected in the list 62 (i.e., a gene list) of the task-performing robot for each task-performing point to configure various chromosomes. In this case, as described through the example of FIG. 5, when the first chromosome is configured, if the computing device 100 designates an initial condition to prevent excessive distribution from being concentrated on a specific robot, a convergence speed may be increased, and a possibility that an optimal point will not be able to be found may be reduced.

The computing device 100 may distribute the target work points to each of the plurality of task-performing robots according to the configured chromosome, calculates a first loss or a second loss, and calculate the calculated first loss and second loss as cost.

The computing device 100 conducts crossover and mutation between the configured chromosomes to re-distribute the target work points to each of the plurality of task-performing robots, and select a chromosome in which the calculated cost is minimized. Through this, the computing device 100 may find a distribution of the target work points for each of the plurality of task-performing robots in which the calculated cost is minimized, and as a result, the computing device 100 distributes the target work points to each of the plurality of task-performing robots to allow each of the plurality of task-performing robots to visit all distributed task-performing points by moving at a small distance, and prevents excessive distribution from being concentrated on a specific task-performing robot, and minimizes work area overlap between robots which belong to the same task-performing station to reduce the collision risk. However, the description of the genetic algorithm is not limited to the example, and various technologies including a neural network model, a machine learning model, etc., may be used in the process of solving a problem of re-distributing the target work points to each of the plurality of task-performing robots in addition to the genetic algorithm.

Disclosed is a computer readable medium storing the data structure according to an exemplary embodiment of the present disclosure. The data structure may refer to the organization, management, and storage of data that enables efficient access to and modification of data.

The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an availably designed data structure, a computing device can perform operations while using the resources of the computing device to a minimum. Specifically, the computing device can increase the efficiency of operation, read, insert, delete, compare, exchange, and search through the availably designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list.

The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality ofty of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality ofty of vertices included in the tree. That is, the tree data structure may be a data structure that does not form a loop in the graph data structure.

In the present disclosure, a network function, an artificial neural network, and a neural network may be used to be exchangeable. From here on, it will be described uniformly using neural networks.

The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for training the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for training the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called nodes. The nodes may also be called neurons. The neural network is configured to include one or more nodes.

The data structure may include data input into the neural network. The data structure including the data input into the neural network may be stored in the computer readable medium. The data input to the neural network may include training data input in a neural network training process and/or input data input to a neural network in which training is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality ofity of weights. The weight may be variable and the weight is variable by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network training process and/or a weight in which neural network training is completed. The weight which varies in the neural network training process may include a weight at a time when a training cycle starts and/or a weight that varies during the training cycle. The weight in which the neural network training is completed may include a weight in which the training cycle is completed. Accordingly, the data structure including the weight of the neural network may include a data structure including the weight which varies in the neural network training process and/or the weight in which neural network training is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of training cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

Figure 10:
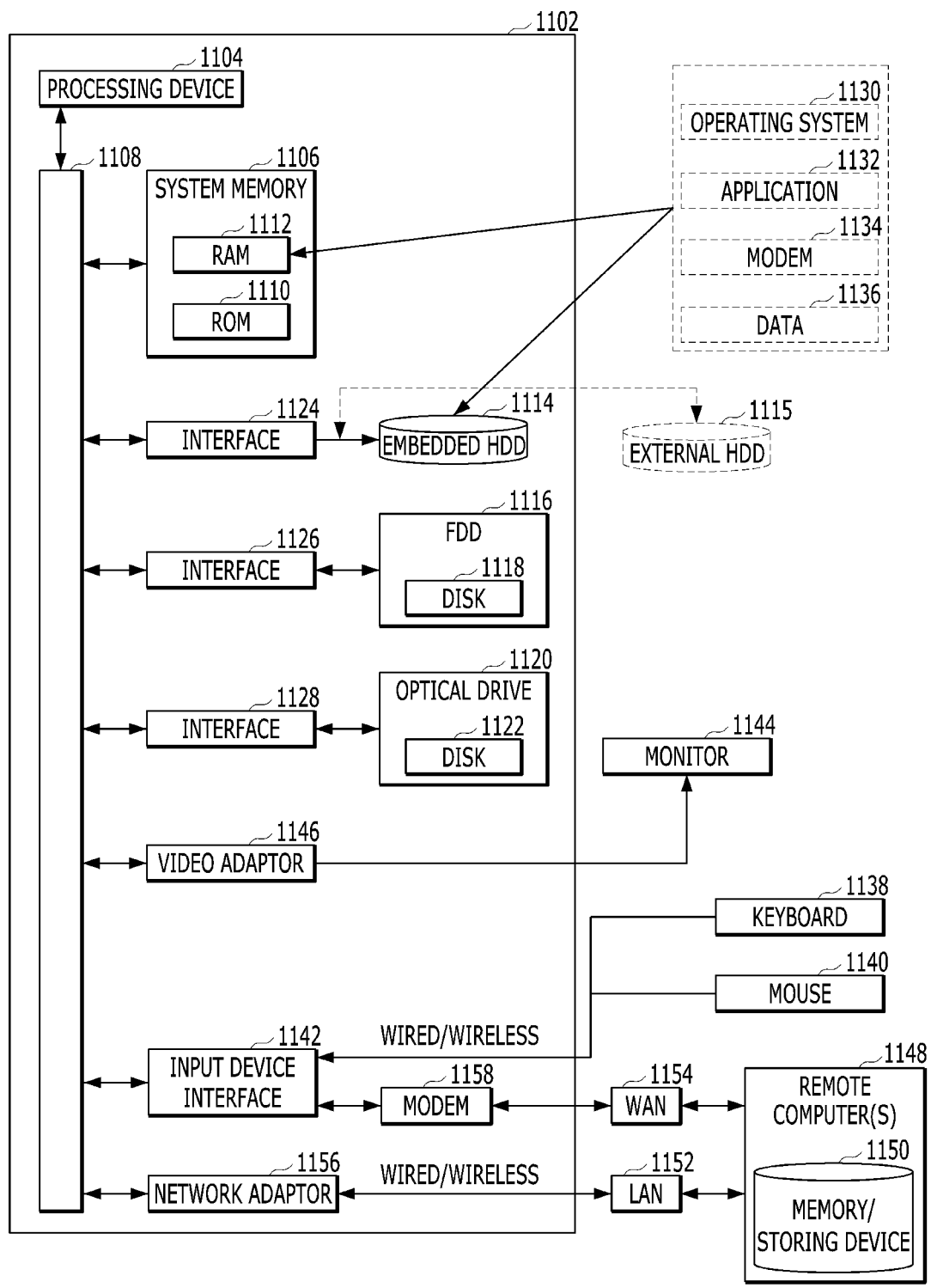
FIG. 10 is a simple and normal schematic view of an exemplary computing environment in which the exemplary embodiments of the present disclosure may be implemented.

FIG. 10 is a normal and schematic view of an exemplary computing environment in which the exemplary embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto. The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them. The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure. Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as software), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various exemplary embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

What is claimed is:

1. A method for distributing work points to a plurality of task-performing robots, the method performed by a computing device, the method comprising:
   determining available work points for each of the plurality of task-performing robots;
   distributing target work points for each of the plurality of task-performing robots based on the determined available work points, and predicting a plurality of target work trajectories for each of the plurality of task-performing robots based on the distributed target work points;
   calculating a first loss or a second loss based on the predicted plurality of target work trajectories; and
   re-distributing target work points to each of the plurality of task-performing robots based on at least one of the calculated first loss or the calculated second loss,
   wherein the calculating of the first loss or the second loss based on the predicted plurality of target work trajectories includes:
   predicting work areas for each of the plurality of task-performing robots based on the predicted plurality of target work trajectories, and
   calculating the second loss based on the predicted work areas.

2. The method of claim 1, wherein the determining of the available work points for each of the plurality of task-performing robots includes:
   determining the available work points based on at least one of a posture, a position, or an entry of each of the plurality of task-performing robots.

3. The method of claim 1, wherein the target work points mean points at which each of the plurality of task-performing robots actually perform work among the determined available work points.

4. The method of claim 1, wherein the process of distributing the target work points to each of the plurality of task-performing robots based on the determined available work points includes:
   distributing the target work points so that a difference in number of target work points distributed to each of the plurality of task-performing robots is minimized based on the determined available work points.

5. The method of claim 1, wherein the predicting of the plurality of target work trajectories for each of the plurality of task-performing robots based on the distributed target work points includes:
   predicting shortest distance target work trajectories passing through all target work points distributed to each of the plurality of task-performing robots.

6. The method of claim 1, wherein the calculating of the second loss based on the predicted work areas includes:
   calculating a crossing area where two or more work areas among the predicted work areas for each of the plurality of task-performing robots cross, and
   calculating the second loss based on the crossing area.

7. The method of claim 1, wherein the re-distributing of the target work points to each of the plurality of task-performing robots based on at least one of the calculated first loss or the calculated second loss includes:
   calculating at least one of the first loss or the second loss as cost, and re-distributing target work points to each of the plurality of task-performing robots to minimize the calculated cost by using a genetic algorithm.

8. A computer program stored in a non-transitory computer-readable storage medium, wherein when the computer program is executed by one or more processors, the computer program allows the one or more processors to perform operations for distributing work points to a plurality of task-performing robots, the operations comprising:
   an operation of determining available work points for each of the plurality of task-performing robots;
   an operation of distributing target work points for each of the plurality of task-performing robots based on the determined available work points, and predicting a plurality of target work trajectories for each of the plurality of task-performing robots based on the distributed target work points;
   an operation of calculating a first loss or a second loss based on the predicted plurality of target work trajectories; and
   an operation of re-distributing target work points to each of the plurality of task-performing robots based on at least one of the calculated first loss or the calculated second loss,
   wherein the operation of calculating of the first loss or the second loss based on the predicted plurality of target work trajectories includes:
   an operation of predicting work areas for each of the plurality of task-performing robots based on the predicted plurality of target work trajectories, and
   an operation of calculating the second loss based on the predicted work areas.

9. A computing device comprising:
   at least one processor; and
   a memory,
   wherein the at least one processor is configured to determine available work points for each of a plurality of task-performing robots,
   distribute target work points for each of the plurality of task-performing robots based on the determined available work points, and predict a plurality of target work trajectories for each of the plurality of task-performing robots based on the distributed target work points,
   calculate a first loss or a second loss based on the predicted plurality of target work trajectories, and
   re-distribute target work points to each of the plurality of task-performing robots based on at least one of the calculated first loss or the calculated second loss, and
   the process of calculating of the first loss or the second loss based on the predicted plurality of target work trajectories includes:
   predicting work areas for each of the plurality of task-performing robots based on the predicted plurality of target work trajectories, and
   calculating the second loss based on the predicted work areas.

* * * * *